Feb. 24, 1959 P. J. RIEPPEL ET AL 2,874,942
MEANS FOR JOINING PRESSURE-WELDED TUBES
Filed Aug. 25, 1954 3 Sheets-Sheet 1
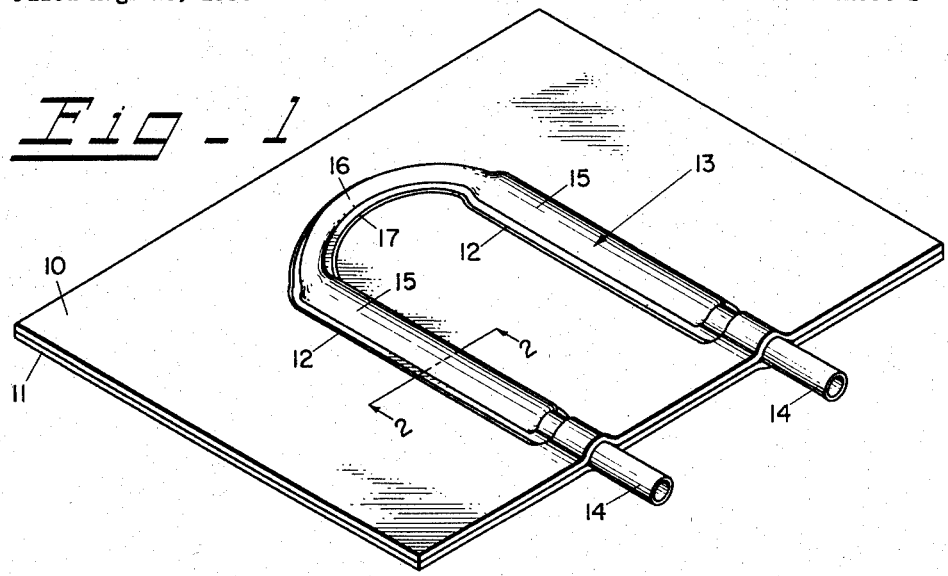
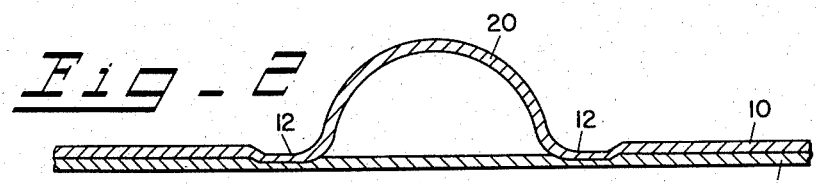
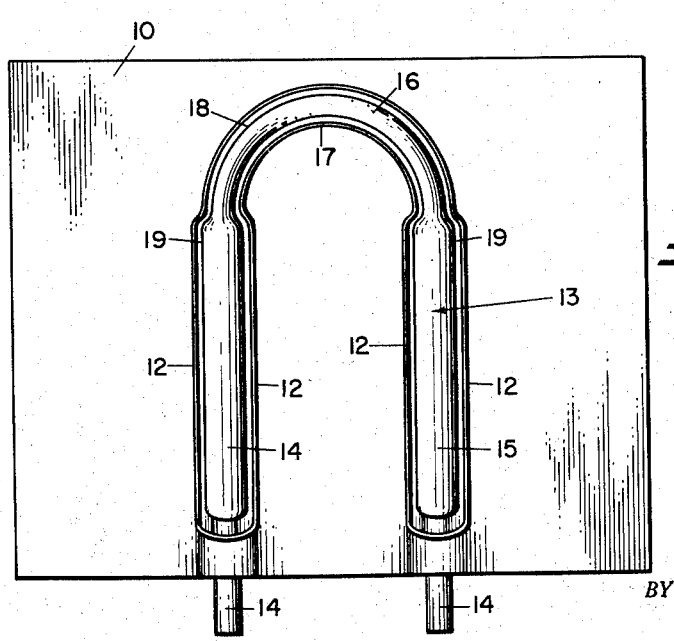
INVENTOR.
Perry J. Rieppel
Melvin C. Clapp
BY
Gray, Mase, & Dunson
ATTORNEYS.

Feb. 24, 1959 P. J. RIEPPEL ET AL 2,874,942
MEANS FOR JOINING PRESSURE-WELDED TUBES
Filed Aug. 25, 1954 3 Sheets-Sheet 2

INVENTOR.
Perry J. Rieppel
Melvin C. Clapp

ATTORNEYS.

Feb. 24, 1959 P. J. RIEPPEL ET AL 2,874,942
MEANS FOR JOINING PRESSURE-WELDED TUBES
Filed Aug. 25, 1954 3 Sheets-Sheet 3
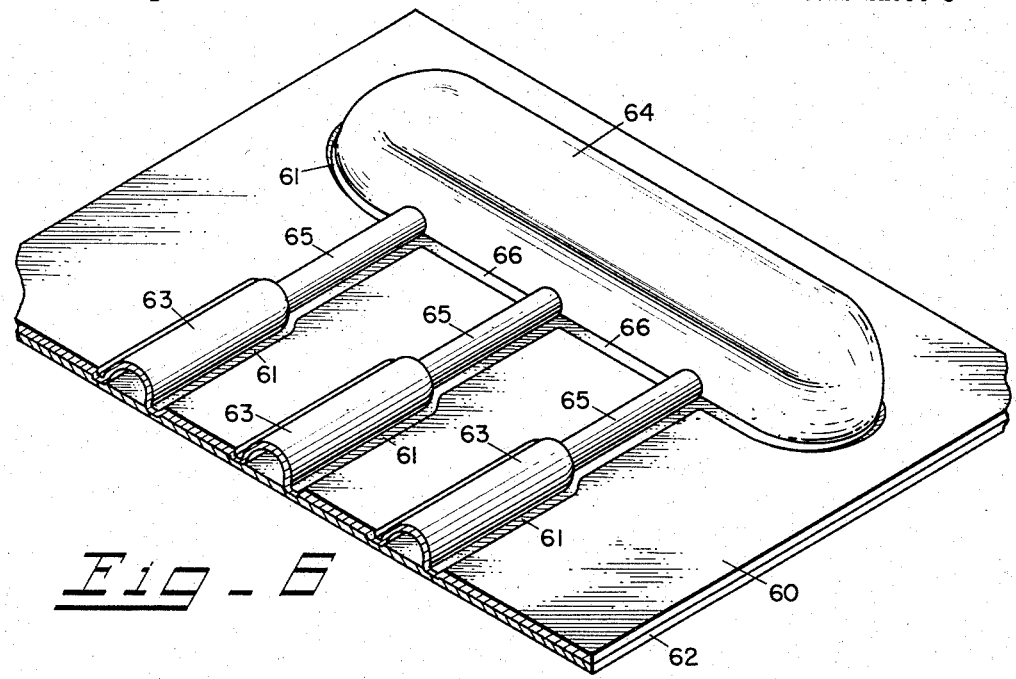
Fig_6
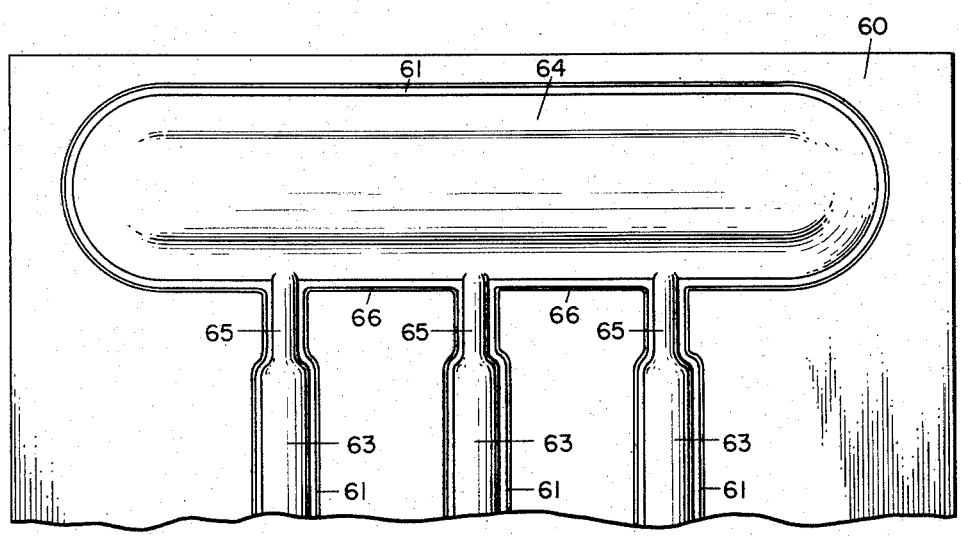
Fig_7
INVENTOR.
Perry J. Rieppel
Melvin C. Clapp
BY
Gray, Mase, & Duncan
ATTORNEYS

United States Patent Office 2,874,942
Patented Feb. 24, 1959

2,874,942

MEANS FOR JOINING PRESSURE-WELDED TUBES

Perry J. Rieppel, Worthington, and Melvin C. Clapp, Columbus, Ohio, assignors, by mesne assignments, to The Metal Specialty Company, Cincinnati, Ohio, a corporation of Ohio Application August 25, 1954, Serial No. 452,082

5 Claims. (Cl. 257—256)

This invention relates to pressure welding and, more in particular, to an improved heat-exchange unit of pressure-weldable materials, such as aluminum and its alloys, formed by a pressure-welding process.

Pressure welding consists primarily in inserting materials to be welded together between a pair of dies and then closing the dies until a predetermined deformation has occurred in the metal being welded. This method of welding has particular application in the welding together of sheet materials. The welding may be done either with or without the application of heat to the material being welded. In the past, it has been found that when no heat is introduced into the process it is necessary to deform aluminum from about 65 to 75% in order to obtain a good weld, while raising the temperature of the aluminum prior to closing the dies necessitates a deformation of only about 50 to 65% for a suitably welded joint. The pressure applied to the dies is necessarily much greater in the case where no heat is applied to the material to be welded. Pressure welding of sheets of aluminum, or similar materials, to form heat-exchange units, is a well-known process. In the formation of heat-exchange units by this method, at least one of a pair of sheets is formed with a continuous tubing or chamber. The sheets are then placed in face-to-face relationship and welded together by the aforementioned pressure-welding process, the resultant product being a sandwich of two pressure-weldable sheets with a continuous tubing extending between the sheets. In order for the tubes to be completely sealed, it is the general practice to have a continuous pressure weld adjacent to all portions of the tubing. Although the chambers may be formed in the sheets prior to the welding operation, the great advantage in this process lies in the fact that the two processes, i. e., the pressure welding and the forming, may be done simultaneously. This simultaneous method is disclosed in copending application Serial No. 415,272, filed March 10, 1954, by Perry J. Rieppel, Melvin C. Clapp, and Edwin G. Elliott, Jr., and also in an article by H. Herrmann, "Manufacture of Light Alloy Charge-Cooler Element," Metal Industry, February 22, 1946, pp. 143–147.

In the production of heat-exchange units, it is the usual practice to have the tubing in the sheets follow a circuitous route in order to obtain the maximum benefits from the flow of heat-exchange fluid through the unit. Thus, in most instances, it is required that the tubing either have turns in a series arrangement, or that a plurality of straight tubes enter a header unit in a parallel system. Although the tubes in a pressure-welded, heat-exchange unit may be formed in turns, it has been found that for practical purposes there is a minimum turn radius permissible for a chamber of a given diameter operating in a system having a given fluid pressure. This limitation arises from the fact that a much greater force is applied to the pressure weld on the inside radius of the turn than on the outside radius of the turn. It has been the usual practice to design a system to be of sufficient strength so that the inside radii of these turns will withstand the necessary pressure. This, of course, results in inefficiencies due to incomplete utilization of the heat-exchange surfaces.

This problem appears to be peculiar to pressure-welded heat-exchange units, and is not apparently of any general significance in heat-exchange units made by such processes as spot welding. This may arise from the fact that the necessary deformation of metal adjacent the tubing in a pressure-welded article produces an inherent weakness not present in heat-exchange units made by other processes.

It has now been found that this difficulty may be overcome by the use of reduced cross-section tubing in the areas of a turn. This solution arises from the fact that a chamber or tubing of smaller cross section has an allowable turn radius that is less than the allowable turn radius of a larger chamber. This solution also has application in the entrance of the tubes into a larger header, the difficulty previously being that there is a minimum distance allowed between the tubes as they enter the header, since the pressure welds about this region would necessarily be subject to a much greater pressure-per-unit area. Thus, it has also been found that by reducing the cross-sectional area of the tubing as it enters a header, a larger number of tubes may safely be connected to a header, i. e., the tubes may be more closely spaced. Although a certain amount of resistance to the fluid flow is introduced by these reduced sections, it has been found that the effect of this increased resistance is almost negligible when the reduced area section length is kept to a minimum.

It is, therefore, an object of this invention to provide an improved pressure-welded heat-exchange unit having greater strength in the areas of turns in the chambers or tubing.

It is also an object to provide a pressure-welded, heat-exchange unit capable of more complete utilization of the heat-exchange surface by reduction of the cross-section area of the tubing in the unit in the area of turns.

Still another object of this invention is to provide an improved turn in a pressure-welded, heat-exchange unit by reducing the cross-sectional area of the tubing in the area of the turn.

A further object is to provide an improved connection for tubing into the header of a pressure-welded heat-exchange unit by reducing the cross-sectional area of the tubing as it enters the header.

A still further object of this invention is to increase the allowable number of tubes entering a header in a pressure-welded heat-exchange unit by reducing the cross-section area of the tubing as it enters the header.

Other objects and advantages of this invention will become obvious from the following specification, the included drawings, and the appended claims.

In the drawings:

Fig. 1 is a perspective view illustrating the reduced cross-section turn of this invention in a single turn pressure-welded heat-exchange unit;

Fig. 2 is a cross-sectional view of the tubing or chamber of the heat-exchange unit of Fig. 1 taken along the dashed line 2—2;

Fig. 3 is a top view of the heat-exchange unit of Fig. 1;

Fig. 6 is a perspective cross section of a pressure-welded heat-exchange unit, illustrating the use of reduced cross-section tubing in a plurality of tubes entering a header, and Fig. 7 is a top view of the heat-exchanger unit of Fig. 6.

Figure 4:
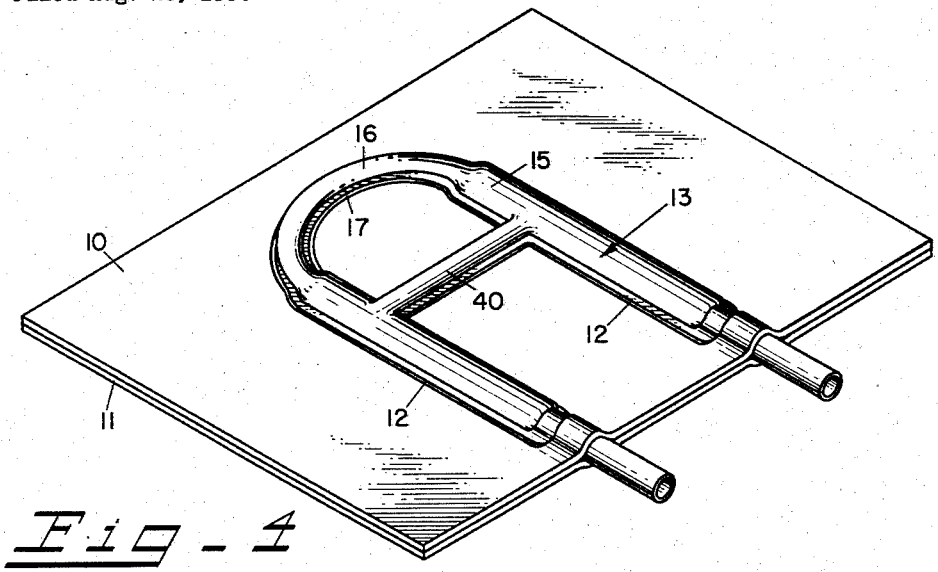
Fig. 4 is a perspective view of a pressure-welded heat-exchange unit showing a modification of the heat-exchange unit of Fig. 1, in which additional tubing of reduced cross section is used to join the straight tubing in order to decrease the resistance of the turn.

Referring now to Figs. 1 and 3, two sheets of pressure-weldable material 10 and 11 are pressure welded together along a continuous weld 12, adjacent periphery of a formed tubing 13. Outlets for the tubing may be provided by any suitable means, such as tubes 14 pressure welded between the sheets and extending from between the sheets. A typical cross-sectional view of the chamber or tubing is illustrated in Fig. 2. In this example, the top sheet 10 is formed substantially into the shape of a semicircular tubing 20 and the bottom sheet is held substantially flat. The pressure welds 12 partially reduce the thickness of the two sheets at the point of welding. Although in this example only one sheet is formed, for certain applications it may be desirable that both sheets are formed. Similarly, different shapes of tubing may also be used, the only limitations being the forming methods that are used to attain a particular shape, and the strength of the article.

Referring again to Figs. 1 and 3, the tubing 13 has two straight portions 15 and a curved portion 16 connecting the straight portions. As has been previously stated, the minimum diameter of the turn is limited by the strength of the weld on the inside edge 17 of the turn. The weakness at this point arises from the fact that the stress is much greater due to the reduced length of the weld. Although the strength of the weld itself may be increased by such methods as widening the width of the weld, the strength of the metal at the edges of the tubing cannot be increased by this method since the metal has a reduced thickness due to the forming of the tube. It has now been found that, by reducing the cross-sectional area of the tubing in the area of the turn, the diameter of the turn may be greatly decreased without impairing the strength of the article. By this means, more complete utilization of the heat-exchange surface may be had, since the tubing may be closely spaced. Although the smaller diameter tubing increases the resistance of the system to some extent, when the length of the reduced cross-section tubing is short in comparison to the total length of the regular size tubing, this effect is not very great. The reduced cross-section tubing 16 may be straight if the cross-sectional area is low enough.

Figure 5:
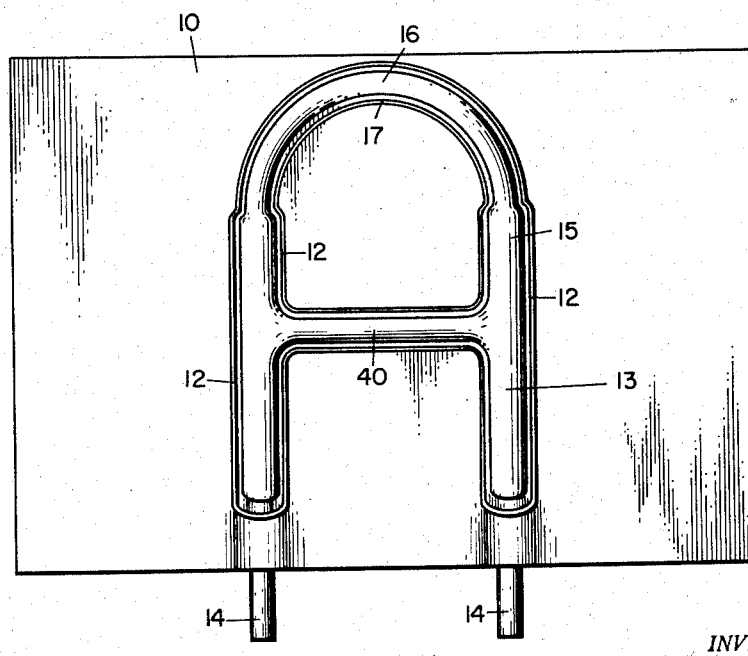
Fig. 5 is a top view of the pressure-welded heat-exchange unit of Fig. 4.

The effect of increased resistance is a system by the use of reduced cross-section tubing at the turns may be removed, however, by the addition of a reduced cross-section bypass 40 (Figs. 4 and 5) between the straight portions of the tubing, in order to make the total cross-sectional area of the bypass 40 and the turn 16 at least equal to the cross section of the straight tubing 13. If the bypass tubing 40 is sufficiently small in cross section, it may be a straight section, as illustrated in Figs. 4 and 5. In practice, however, it may be desirable to use a somewhat larger bypass and form it in a curved shape. If desired, a plurality of such bypasses may be used.

In Figs. 1, 3, 4, and 5, the centerline of the smaller tube 16 is illustrated as being tangent to the centerline of the straight sections 13. This is not necessary, however, and the centerline of the curved section may, if desired, be tangent with other lines parallel to the centerline of the straight section. For example, the outside edge 18 of the curved section may be tangent to the outside edges 19 of the straight sections, thus forming a smooth junction on the outside edges.

In another modification of this invention (Figs. 6 and 7) tubing of reduced cross-section area may be used to increase the allowable number of tubes that enter a header in a pressure-welded heat exchanger, i. e., the tubes may be more closely spaced. In this modification, an upper sheet 60 of pressure-weldable material is pressure welded in a continuous pressure weld 61 to a lower sheet 62 also of pressure-weldable material. A plurality of tubes 63 and a header 64 are formed into at least one of the sheets. As the tubing 63 enters the header 64, it passes through a tubing 65 of reduced cross-section area. As in the case of turns in tubing, the inside weld 66 between the tubings limits the distance between the tubings, that is, only a certain number of straight tube sections 63 may enter the header 64 without seriously impairing the strength of the inside weld 66. Now it has been found that when a tubing of decreased cross section is used to enter a header, a larger number of tubes may enter the boiler. Since these reduced cross-sectional area tubings may be made very short in length, the increase in resistance in the system due to the constrictions is negligible.

Thus, it has been shown, and it is the basis of this invention, that by employment of sections of tubing of reduced cross-sectional area in a pressure-welded heat-exchange unit, a greater utilization may be made of the heat-exchange surfaces, since a much longer tubing may be placed within a given area by taking advantage of the closer spacing of tubes possible. This principle is applicable in parallel systems as well as in series systems and combinations thereof.

It will be understood, of course, that, while the forms of the invention herein shown and described constitute preferred embodiments of the invention, it is not intended herein to illustrate all of the possible equivalent forms or ramifications of the invention. For purposes of definition, it is to be understood that the words "tubing" and "chamber" are interchangeable within the meaning of this invention. It will also be understood that the words used are words of description rather than of limitation, and that various changes, such as changes in shape, relative size, and arrangements of parts, may be substituted without departing from the spirit or scope of the invention herein disclosed.

What is claimed is:

1. In a pressure-welded heat-exchange unit comprising a pair of sheets of pressure-weldable material and a pressure-weld deformation in at least one of said pair of sheets, a plurality of closely spaced formed tubes in at least one of said sheets, means for connecting said tubes, said means comprising tubing having a smaller cross-sectional area than that of each said tube, said sheets having a continuous pressure weld adjacent the periphery of said tubes and tubing welding said sheets together by said deformation.

2. In a pressure-welded heat-exchange unit comprising a pair of sheets of pressure-weldable material and a pressure-weld deformation in at least one of said pair of sheets, a pair of substantially straight, closely spaced tubes formed in at least one of said sheets, and a curved tube joining the ends of said straight tubes, said curved tube having a smaller cross-sectional area than each said straight tube, said sheets having a continuous pressure weld adjacent the periphery of said straight and curved tubes welding said sheets together by said deformation.

3. In a pressure-welded heat-exchange unit comprising a pair of sheets of pressure-weldable material and a pressure-weldable deformation in at least one of said pair of sheets and having a plurality of closely spaced tubes formed in at least one of said sheets, means for connecting said tubes together, said means comprising at least one tube having a smaller cross-sectional area than each said first-mentioned tube, said sheets having a continuous pressure weld adjacent the periphery of said first-mentioned tubes and said last-mentioned tube, welding said sheets together by said deformation.

4. In a pressure-welded heat-exchange unit comprising a pair of sheets of pressure-weldable material and a pressure-weld deformation in at least one of said pair of sheets, and having a header and a plurality of closely spaced tubes entering said header formed in at least one of said sheets, means for increasing the strength of said unit at the point where said tubes enter said header by allowing close spacing of said tubes in combination with a sufficient length of pressure weld adjacent said header and between said tubes, said means comprising tubing of smaller cross-sectional area than each said first-mentioned tube connected between said header and said first-mentioned tubes, said sheets having a continuous pressure weld adjacent the periphery of said header, said first-mentioned tubes, and said connecting tubing, welding said sheets together by said deformation.

5. In a pressure-welded heat-exchange unit comprising a pair of sheets of pressure-weldable material and a pressure-weld deformation in at least one of said pair of sheets, a plurality of closely spaced, substantially straight, formed tubes in at least one of said sheets, and means for connecting said tubes in such manner as to obtain optimum bursting strength in the region of said connecting means, said connecting means comprising at least one tube having a smaller cross-sectional area than each said first-mentioned tube being connected, said sheets having a substantially continuous pressure-weld adjacent the periphery of said first-mentioned tubes and said last-mentioned tube, welding said sheets together by said deformation.

References Cited in the file of this patent

UNITED STATES PATENTS

| | | |
|---|---|---|
| 2,304,876 | Benson | Dec. 15, 1942 |
| 2,589,490 | Goldberg | Mar. 18, 1952 |
| 2,626,130 | Raskin | Jan. 20, 1953 |
| 2,662,273 | Long | Dec. 15, 1953 |

UNITED STATES PATENT OFFICE
CERTIFICATE OF CORRECTION

February 24, 1959

Patent No. 2,874,942

Perry J. Rieppel et al.

It is hereby certified that error appears in the printed specification of the above numbered patent requiring correction and that the said Letters Patent should read as corrected below.

Column 3, line 49, for "resistance is" read -- resistance in --.

Signed and sealed this 9th day of June 1959.

(SEAL)
Attest:

KARL H. AXLINE
Attesting Officer

ROBERT C. WATSON
Commissioner of Patents